(12) United States Patent
Bell et al.

(10) Patent No.: US 11,150,488 B2
(45) Date of Patent: Oct. 19, 2021

(54) FIXED DEPTH DISPLAY FOR VEHICLE INSTRUMENT PANEL

(71) Applicant: PURE DEPTH LIMITED, Auckland (NZ)

(72) Inventors: Gareth P. Bell, Auckland (NZ); James S. Emslie, Auckland (NZ)

(73) Assignee: PURE DEPTH LIMITED, Auckland (NZ)

( * ) Notice: Subject to any disclaimer, the term of this patent is extended or adjusted under 35 U.S.C. 154(b) by 472 days.

(21) Appl. No.: 15/378,466

(22) Filed: Dec. 14, 2016

(65) Prior Publication Data

US 2018/0164597 A1 Jun. 14, 2018

(51) Int. Cl.
| | | |
|---|---|---|
| *G09G 3/36* | (2006.01) |
| *G02B 30/52* | (2020.01) |
| *G09G 3/00* | (2006.01) |
| *B60K 35/00* | (2006.01) |
| *G02B 30/50* | (2020.01) |
| *G09G 3/34* | (2006.01) |

(52) U.S. Cl.
CPC .............. *G02B 30/52* (2020.01); *B60K 35/00* (2013.01); *G02B 30/50* (2020.01); *G09G 3/003* (2013.01); *B60K 2370/152* (2019.05); *B60K 2370/1531* (2019.05); *B60K 2370/343* (2019.05); *B60Y 2400/92* (2013.01); *G09G 3/3406* (2013.01); *G09G 3/36* (2013.01)

(58) Field of Classification Search
CPC ........ G09G 3/36; G09G 3/003; G09G 3/3406; G02B 30/52; G02B 30/50; B60K 35/00; B60K 2370/1531; B60K 2370/152; B60K 2370/343; B60Y 2400/92

See application file for complete search history.

(56) References Cited

U.S. PATENT DOCUMENTS

| | | | |
|---|---|---|---|
| 6,667,786 B2 * | 12/2003 | Van de Ven | G02B 3/005 348/E5.136 |
| 6,909,556 B2 | 6/2005 | Berman et al. | |
| 7,347,558 B2 | 3/2008 | Berman | |
| 9,519,154 B2 * | 12/2016 | Bell | G02B 27/46 |
| 2001/0021065 A1 | 9/2001 | Braun | |
| 2002/0093607 A1 | 7/2002 | Van de Ven et al. | |

(Continued)

FOREIGN PATENT DOCUMENTS

| | | |
|---|---|---|
| CN | 1401095 A | 3/2003 |
| CN | 102077601 A | 5/2011 |

(Continued)

OTHER PUBLICATIONS

European Search Report dated Sep. 4, 2020 for European Application No. 17882002.3.

(Continued)

*Primary Examiner* — Jeff Piziali
(74) *Attorney, Agent, or Firm* — Nixon & Vanderhye P.C.

(57) ABSTRACT

A display system may include a display screen configured to display an image, a backlight configured to provide collimated or substantially collimated light to the display screen, and a transparent contoured projection screen. The transparent contoured projection screen may include portions at different elevations to display different elements to a viewer in a three dimensional manner.

13 Claims, 6 Drawing Sheets

(56) References Cited

U.S. PATENT DOCUMENTS

| | | | |
|---|---|---|---|
| 2002/0186466 A1* | 12/2002 | Christian | H04N 13/337 359/472 |
| 2003/0151833 A1* | 8/2003 | Berman | G02B 27/283 359/831 |
| 2004/0032659 A1* | 2/2004 | Drinkwater | F21V 33/006 359/558 |
| 2005/0237610 A1* | 10/2005 | Sekiguchi | G03B 21/10 359/457 |
| 2006/0007403 A1* | 1/2006 | Berman | G02B 5/3016 353/33 |
| 2006/0191177 A1* | 8/2006 | Engel | B60K 35/00 40/453 |
| 2006/0203338 A1* | 9/2006 | Pezzaniti | G02B 27/26 359/465 |
| 2008/0316604 A1* | 12/2008 | Redert | G02B 5/201 359/614 |
| 2009/0079662 A1* | 3/2009 | Takada | G02B 27/2278 345/1.1 |
| 2010/0033680 A1* | 2/2010 | Krijn | G02B 27/2214 353/8 |
| 2010/0085642 A1* | 4/2010 | Drinkwater | F21V 33/006 359/567 |
| 2010/0191419 A1* | 7/2010 | Habeney | B60K 35/00 701/36 |
| 2011/0154897 A1* | 6/2011 | Ishihara | B60K 37/02 73/431 |
| 2011/0164036 A1* | 7/2011 | De Zwart | G02B 27/2214 345/419 |
| 2012/0098941 A1 | 4/2012 | Joseph et al. | |
| 2014/0362076 A1* | 12/2014 | Bell | G02B 27/2214 353/8 |
| 2015/0323805 A1 | 11/2015 | Bell | |
| 2016/0012630 A1 | 1/2016 | Bell | |

FOREIGN PATENT DOCUMENTS

| | | | |
|---|---|---|---|
| CN | 102169282 | 8/2011 | |
| WO | WO 2008/042465 | 4/2008 | |
| WO | WO 2009/156968 | 12/2009 | |
| WO | WO-2014195136 A1 * | 12/2014 | G02B 30/27 |

OTHER PUBLICATIONS

Chinese Office Action dated Nov. 11, 2020 for CN Application No. 201780077842.9.

* cited by examiner

FIXED DEPTH DISPLAY FOR VEHICLE INSTRUMENT PANEL

BACKGROUND

The invention relates generally to displays and, more particularly, to display systems and methods for displaying three-dimensional features.

Traditionally, displays present information in two dimensions. Images displayed by such displays are planar images that lack depth information. Because people observe the world in three-dimensions there have been efforts to provide displays that can display objects in three-dimensions. For example, stereo displays convey depth information by displaying offset images that are displayed separately to the left and right eye. When an observer views these planar images they are combined in the brain to give a perception of depth. However, such systems are complex and require increased resolution and processor computation power to provide a realistic perception of the displayed objects.

Multi-component displays including multiple display screens in a stacked arrangement have been developed to display real depth images in a three dimensional (3D) manner. Each display screen may display its own image to provide visual depth due to the physical displacement of the display screens. However, such systems also are complex for some applications and need increased processor computation to display multiple images on different screens.

SUMMARY

Exemplary embodiments of this disclosure provide a simplified display system that can provide visual depth and portray three dimensional images using only a single display panel (e.g., LCD or OLED panel). The exemplary display system can provide the visual depth with a display screen that is viewed via a shaped projection screen having respective contour portions for displaying different elements of an image. For example, one element (e.g., needle for indicating fuel level, RPMs, temperature, time, etc.) of a vehicle instrument panel image may be displayed via a high elevation portion of the shaped projection screen, and a second element (e.g., text, numbers, rear surface, etc.) of the vehicle instrument panel may be displayed via a low elevation portion of the shaped projection screen. This invention is applicable to other displays as well, such as watch displays that may be worn by a user. In such a manner, a three dimensional image of at least a portion of the vehicle instrument panel appears to a viewer, via just one display panel. In other words, the display system can provide visual depth with a single display screen that is viewed by a viewer/observer via a shaped projection screen that is located between the display panel and the viewer/observer.

According to one exemplary embodiment, a display system may include a display screen configured to display an image, a light source configured to provide collimated light to the display screen, and a transparent projection screen. The transparent projection screen may include a random shaped or predetermined shaped pattern on a side facing the display screen for scattering the collimated light provided by the light source and passed through or reflected by the display screen. The projection screen may include at least a first surface (e.g., high elevation portion) that is parallel to the display screen and a second surface (e.g., low elevation portion) that is parallel to the display screen and is further away from the display screen as compared to the first surface. Angled or vertical walls may be provided between and connecting respective first and second surfaces.

In an example embodiment of this invention, there is provided a display system for displaying an image to a viewer in a three dimensional manner, the display system comprising: a display panel; a backlight configured to provide light to the display panel; a transparent projection screen on a front side of the display panel, so as to be located between the display panel and the viewer; and wherein the projection screen comprises a high elevation portion and a low elevation portion at first and second different respective elevations relative to the display panel, so that the projection screen is configured to display to the viewer a first element of the image via the high elevation portion and a second distinct element of the image via the low elevation portion, so that a difference in elevation between the high and low elevation portions causes the image to appear three dimensional to the viewer.

In an exemplary embodiment, a system may include a processing system including one or more processors and memory coupled to the one or more processors, and a non-transitory storage including instructions. When the instruction are executed by the processing system, the processing system may be controlled to: receive data including a plurality of graphics for display on a display; display, using the received data, a first graphic of the plurality of graphics in a first portion of display screen, the first portion of the display screen corresponding to a first planar section of a rear projection screen disposed in front of the display screen, the first planar section being parallel to a surface of the display screen; display, using the received data, a second graphic of the plurality of graphics, in a second portion of display screen that is different from the first portion of the display screen, the second portion of the display screen corresponding to a second planar section of the rear projection screen disposed in front of the display screen, the second planar section being parallel to a surface of the display screen and being displaced from the first planar section in a direction away from the surface of the display screen; and display a third graphic in a third portion of display screen that is different from the first and second portions of the display screen, the third portion of the display screen corresponding to a connecting section of the rear projection screen connecting the first section and the second section of the rear projection screen.

The embodiments of this disclosure provide for a simple display with realistic depth cues. A display with a shaped projection screen may limit the use of the display for applications that need the specific depth cues provided by fixed depth display. However, in applications that display the same type of information (e.g., an instrument panel) the embodiment of this disclosure may provide a display that is simple and costs less than traditional three-dimensional displays providing similar depth cues.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Figure 1:
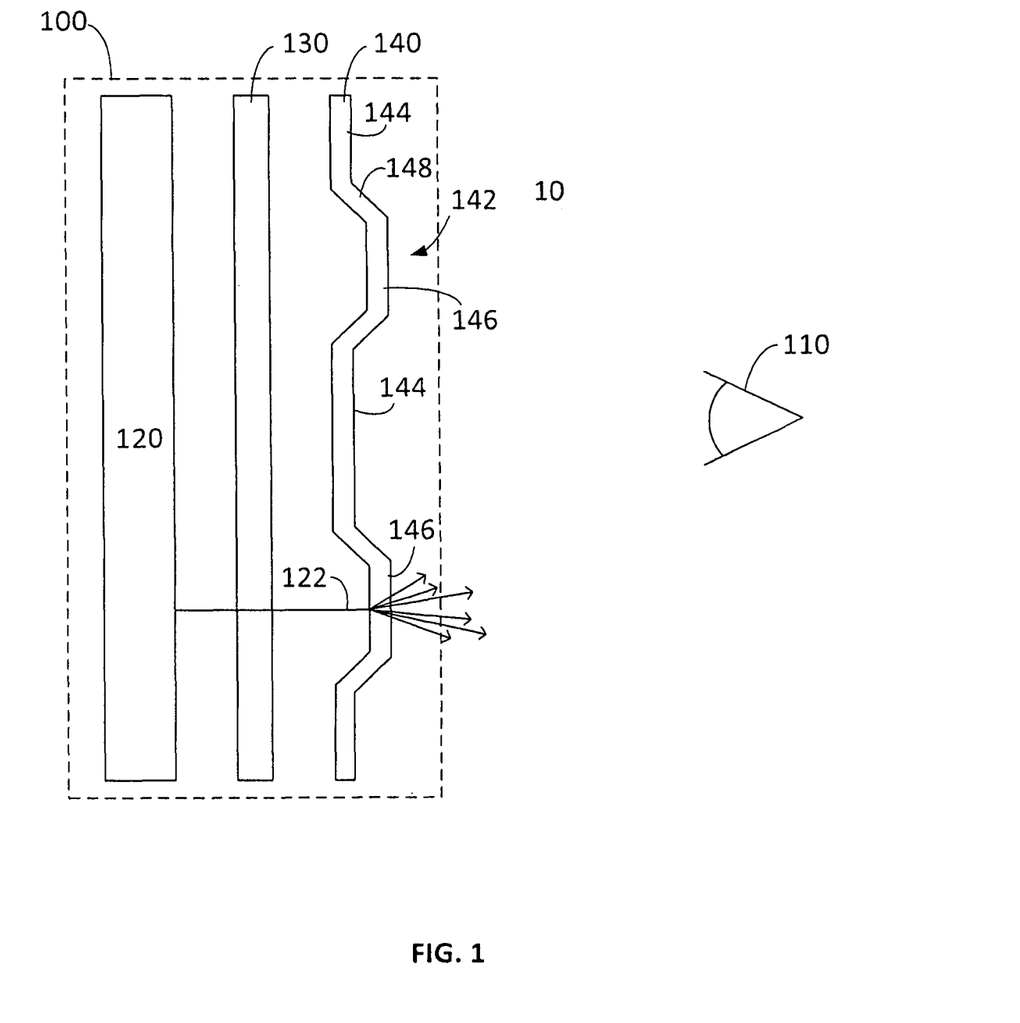
FIG. 1 illustrates a display system according to an embodiment of the present disclosure.

FIG. 1 illustrates a display system 100 (or 10) according to an embodiment of the present disclosure. The display system 100 may include backlight (including at least one light source) 120, a display panel/screen 130 such as an LCD panel or an OLED panel, and a contoured projection screen 140. The display panel/screen 130 may be disposed parallel or substantially parallel to and between the backlight 120 and the projection screen 140, and the contoured projection screen is provided between the display panel/screen 130 and the viewer/observer 110. In one embodiment, the backlight 120, the display panel/screen 130, and the contoured projection screen 140 may be disposed in a common housing. The projection screen 140 may be shaped into features that allow for an accurate representation of dials, sliders, warning lights, buttons, or other elements to a viewer than may be in the context of a user interface.

The display system 100 may display graphical information to an observer/viewer 110 with realistic depth cues using a single display screen 130 that is viewed via a shaped projection screen 140 that mimics realistic depth cues. For example, the projection screen 140 may be shaped to mimic dials and gauges found in a vehicle instrument panel or wristwatch display, and the display screen 130 may display graphical information for viewing via the shaped projection screen 140. Thus, in additional to vehicle instrument panels, this invention is also applicable to other displays as well such as wristwatch displays that may be worn by a user.

Figure 6:
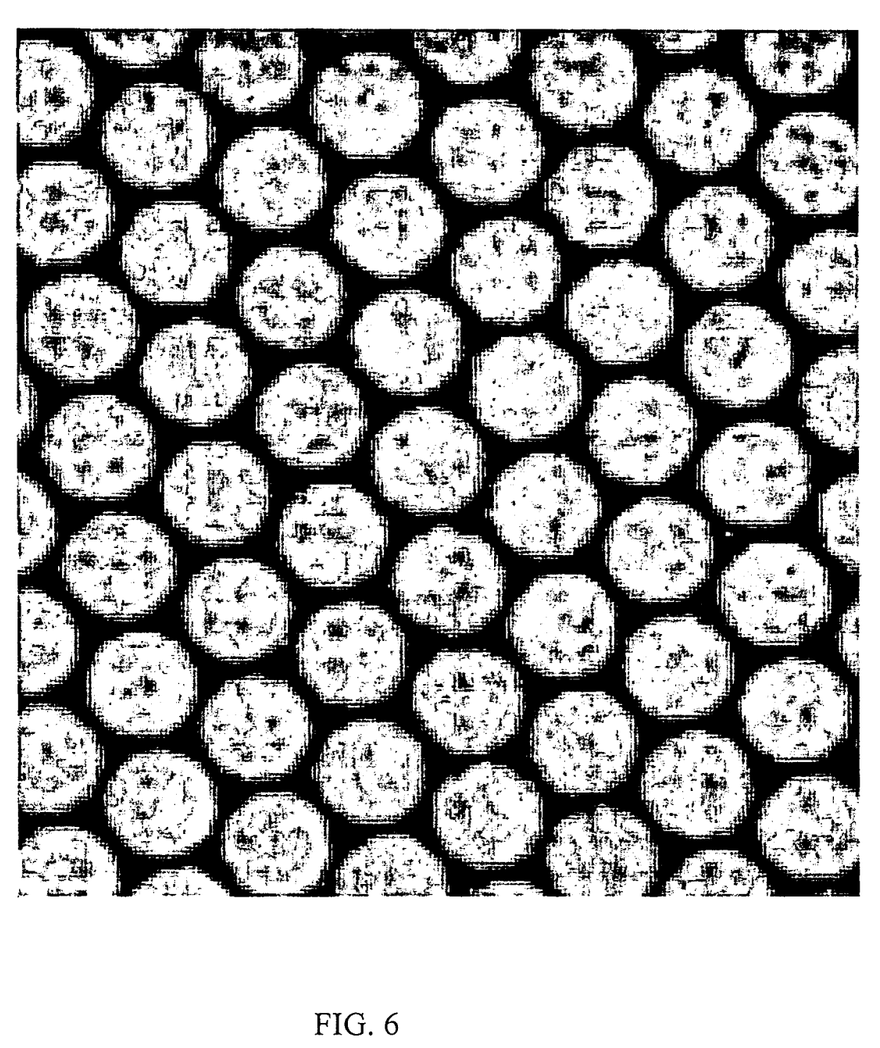
FIG. 6 is a top plan view of an example optical fiber array that may be used for a collimated backlight and/or for a front contoured projection screen according to example embodiments of this invention.

Contoured/shaped projection screen 140 has respective contour portions 144, 146 for displaying different elements of a vehicle instrument panel image, so that the image appears three dimensional to observer/viewer 110 (e.g., operator of the vehicle). For example, one element (e.g., needle for indicating fuel level, RPMs, temperature, time, etc.) of a vehicle instrument panel image may be displayed via a high elevation portion 146 of the shaped projection screen, and a second distinct element (e.g., text, numbers, rear surface, etc.) of the vehicle instrument panel may be displayed via a low elevation portion 144 of the shaped projection screen. The difference in height/elevation (relative to the backlight 120) causes the overall image to appear three dimensional to the viewer 110. In other words, the element(s) shown via portion 146 appears closer to the viewer 110 than does the element(s) shown via portion 144. Thus, the contoured projection screen 140 functions differently, and is structurally different, than a conventional diffuser on the front of a display. In such a manner, a three dimensional image of at least a portion of the vehicle instrument panel appears to a viewer, via only one display panel 130. In certain example embodiments, the contoured projection 140 screen may be made up of a shaped array of optical fibers as shown in FIG. 6

The backlight 120 may be configured to provide illumination for the display system 100. The backlight 120 includes at least one light source and may provide collimated or substantially collimated light 122 that is transmitted through the display screen/panel 130 and to the projection screen 140 to portray an image representing at least part of a the vehicle instrument panel to the viewer 110. The backlight 120 may include a light source with diverging light and a collimator to provide the collimated light 122, and may optionally comprise a row of edge mounted LED light sources that project light into a light guide which in turn directs the light toward the panel 130 in a collimated or substantially collimated manner. The backlight may optionally include reflective collimated surfaces such as parabolic mirrors and/or parabolic concentrators for directing light in a collimated or substantially collimated manner toward the panel 130 and projection screen 140. In one embodiment, the backlight may provide a 1 to 1 mapping between the pixels on the display screen 130 and positions on the projection screen 140.

The display panel/screen 130 may include a liquid crystal display (LCD) matrix. Alternatively, the display screen 130 may include organic light emitting diode (OLED) displays, transparent light emitting diode (TOLED) displays, cathode ray tube (CRT) displays, field emission displays (FEDs), field sequential display or projection displays. The display screen 130 is not limited to the listed display technologies and may include other display technologies that allows for the projection of collimated light. In one embodiment, the collimated light may be provided by a projection type system including a light source and one or more lenses and/or a transmissive or reflective LCD matrix.

The display screen/panel 130 may be configured to display graphical information for viewing by the observer 110, where the observer may include, for example, a vehicle operator, an electrical and/or mechanical optical reception device (e.g., a still image, a moving-image camera, etc.), or the like. Graphical information such as an image may include visual display of objects and/or texts. In one embodiment, displaying the image may include moving objects (e.g., needle(s) and/or text, or changing or providing animations to the objects and/or text. The animations may include changing the color, location, shape and/or size of the objects or text.

The contoured projection screen 140 may comprise a transparent material (e.g., transparent plastic). The projection screen 140 may be approximately the same size as the display screen 130, and overlaps all or substantially all of the display screen 130. The projection screen 140 may include a front surface facing the observer 110 and a rear surface facing the backlight and panel/screen 130. The rear/back surface of the projection screen 140 may include random shaped patterns to scatter the collimated light generated by the backlight and panel 130. The random shaped patterns may be created by sand blasting or spark eroding techniques. In some embodiments, the projection screen 140 may be a material including a predefined pattern providing a specific luminance distribution light shaping pattern. In one embodiment, the projection screen 140 may be a light shaping diffuser or one or more light shaping diffusers may be applied to the back surface and/or the front surface of the projection screen 140. The light shaping diffuser may be configured to receive the collimated light and perform unparalleled beam shaping to provide angularly specified illumination patterns. For example, light shaping diffusers distributed by Luminit, LLC or RPC Photonics, Inc may be used in the display system 100. In one embodiment, the projection screen 140 may be a bulk diffuser with high refractive index particles, such as titanium dioxide, embedded in a lower refractive index matrix.

In certain example embodiment, the projection screen 140 may comprise an array of optical fibers as shown in FIG. 6. Such a screen 140 may be made up of shaped optical fiber array blocks tiled together across the apparatus. For example, a two dimensional array of fibers approximately the size of the rear panel could be used, and the front surface of the array could be sculpted to form a slanted, contoured, and/or curved projection screen surface (e.g., see elements 144, 146, 148, 140 in FIG. 1, or 242 in FIG. 2). A second display may be added in front of the sculpted array to show gauge needles and/or the like so that they appear to be floating in a three dimensional manner in certain example embodiments.

As illustrated in FIG. 1, the projection screen 140 may be shaped to provide one or more specific features 142, 146 that project from the rear planar surface 144 of the projection screen 140 away from the display screen 130 and in the direction of the observer/viewer 110. For example, the elevated features 142, 146 may be as viewed from the point of view of the viewer, circular, square, rectangular, or any other suitable shape that protrudes from rear planar surface 144 of the projection screen 140 and which is parallel or substantially parallel to the display screen 130. The specific features 142, 146 may provide depth and other visual effects. For example, the specific features of projection screen 140 may mimic areas where dials, gauges, sliders, warning lights, buttons and/or other elements are found in an instrument panel. One element (e.g., needle for indicating fuel level, RPMs, temperature, time, etc.) of a vehicle instrument panel or other image may be displayed via a high elevation portion 146 of the shaped projection screen, and a second distinct element (e.g., text, numbers, background, rear surface, etc.) of the image may be displayed via a low elevation portion 144 of the shaped projection screen. The difference in height/elevation (relative to the backlight 120) between portions 144 and 146 causes the overall image to appear three dimensional to the viewer 110. In other words, the element(s) shown via portion 146 appears closer to the viewer 110 than does the element(s) shown via portion 144. In such a manner, a three dimensional image of at least a portion of the vehicle instrument panel, wristwatch, or the like appears to a viewer, via a system having only one display panel/screen 130.

Thus, the projection screen may comprise a high elevation portion 146 and a low elevation portion 144 at first and second different respective elevations relative to the display panel 130, so that the projection screen is configured to display to the viewer a first element of the image via the high elevation portion and a second distinct element of the image via the low elevation portion, so that a difference in elevation between the high and low elevation portions causes the image to appear three dimensional to the viewer.

Figure 2:
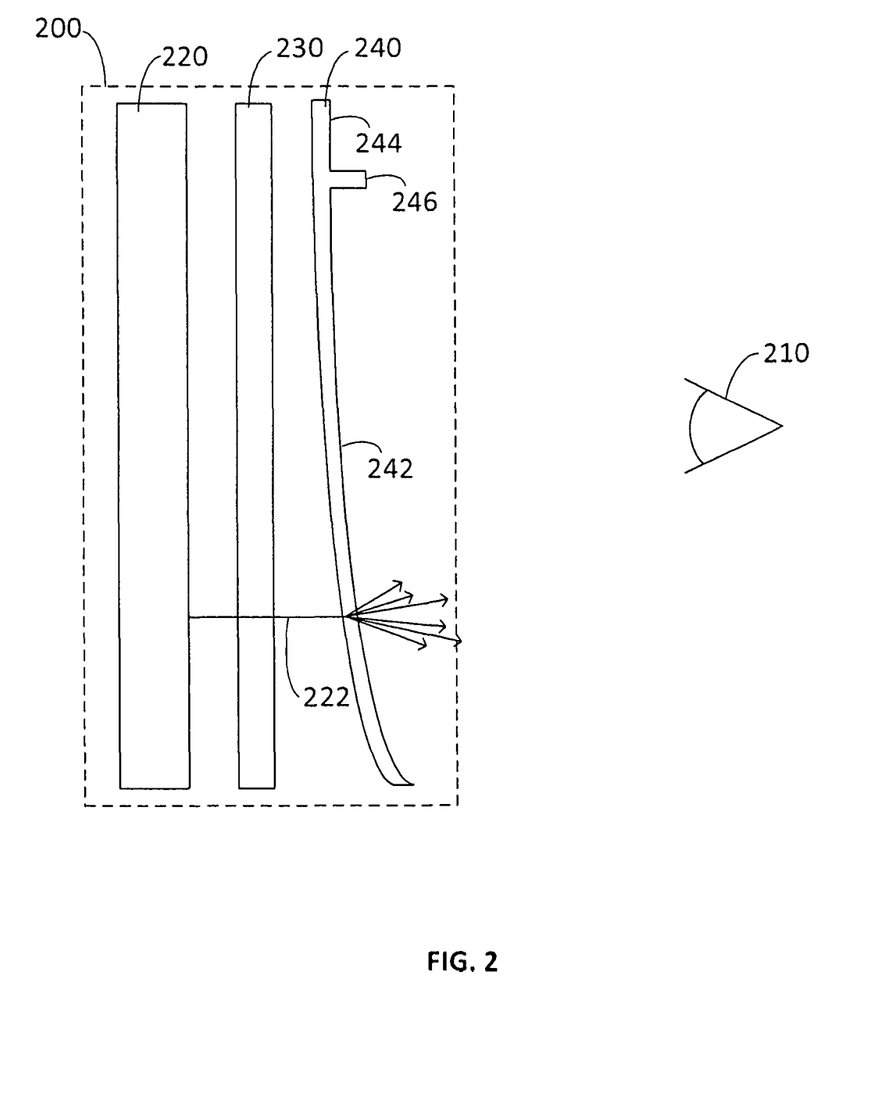
FIG. 2 illustrates a display system according to another embodiment of the present disclosure.

In certain example embodiments of this invention, such as for vehicle dashboard applications where gauges or the like are being shown, the height difference in elevation between the high elevation portion(s) 146 and the low elevation portion(s) 144 (relative to the display panel 130 or 230) is on the order of millimeters and may be from about 4 mm to 20 mm, more preferably from about 6 mm to 16 mm. In other words, the outer surface of the high elevation portion(s) is about 4-20 mm (more preferably from about 6-16 mm, even more preferably from about 8-15 mm) farther from the display panel 130 than is the outer surface of the low elevation portion(s) 144. These height differences are much greater than, for instance, height differences between elements of a conventional diffuser for example. In certain example embodiments of this invention, such as for wristwatch applications where time features are being shown, the height difference in elevation between the high elevation portion(s) 146 and the low elevation portion(s) 144 may be from 0.5 to 6 mm, more preferably from 1 to 6 mm, and most preferably from 1 to 5 mm.

In certain example embodiments, rear portions 144 may be planar and parallel or substantially parallel to the display screen 130, and elevated portions 146 may also be planar and parallel or substantially parallel (parallel +/−10 degrees) to the display screen 130 and the rear portions 144. As shown in FIG. 1, angled connecting walls 148 (e.g., angled from about 20-80 degrees, more preferably from about 30-70 degrees, from portions 146 and/or 144) may be provided between and connecting portions 144 and 146. However, in alternative embodiments, connecting walls 148 may be provided perpendicular or substantially perpendicular to the major surface(s) of portions 144 and/or 146. Connecting walls 148 may be planar as shown in FIG. 1, or alternatively may be curved, in different embodiments of this invention.

The display screen 130 may be configured to receive data to display graphics in portions of the display screen 130 that correspond to specific features 142 in the display screen 140. For example, the display screen 130 may display direction information (e.g., a map and/or textual direction instructions) in a portion of the display screen 130 that corresponds to the portion of the projection screen 140 that is planar surface that is closest to the display screen. The display screen 130 may display warnings and/or dials/needles (e.g., fuel level needle, RPM needle, speedometer needle, low fuel warning or low tire pressure using text and/or symbols) in a portion of the display screen 130 that corresponds to the portion(s) 146 of the projection screen 140 that is planar and further away from the display screen 130. Accordingly, the directional information and/or text may appear to an observer as having a depth that is further away as compared to displayed dial/needle and/or warning.

The processing system controlling the display of the display screen 130 may be configured to adjust the displayed graphics to adjust for the geometric distortion caused to the image by slanted sections of the projection screen 140. The adjustment may include modifying what data is displayed and/or how the data is displayed to compensate for the geometric distortion. For example, the graphic for display may be modified such that portion of the graphic that are viewed via the connection sections 148, which is not parallel to the display screen 130, may account for geometric distortion. The portions of the image may be modified by shifting the pixels of the image, enlarging portions of the image, and/or removing portions of the image.

In one embodiment, user control may be provided to adjust the way the image is displayed in portions of the image that correspond sections of the projection screen 140 that are slanted or curved. Thus, an observer 110 may be able to adjust the degree of correction applied to the image in portions of the image that may be viewed with geometric distortion due to the shaped projection screen 140. In another embodiment, portions of the image that correspond to different sections of the projection screen 140 may be adjusted separately. For example, in response to a user command or detection of a certain condition (e.g., change in ambient light detected by a sensor), the color and/or intensity of only a graphic viewed via the first section 144, the second section 146, or the connection section 148 may be changed.

In one embodiment, the sections of the projection screen 140 may be configured to diffuse light differently from one or more other sections of the projection screen 140. This configuration may allow for light to be scattered differently based on whether the surface of the projection screen is physically positioned closer to the observer 110 and/or the shape and/or angle at which the surface is provided. The light may also be scattered differently based on what will be viewed by the observer via each section of the projection screen 140. For example, it may be desirable to display information in some sections of the projection screen 140 (e.g., sections with detailed information) with a higher brightness and/or clarity as compared to other sections of the projection screen 140 (e.g., sections with visual effects or aesthetics).

In one embodiment, section(s) 144 of the projection screen 140 may be configured to diffuse light differently from the way section(s) 146 is configured to diffuse light. In one embodiment, the first section 144 and the second section 146 may be configured to diffuse light in the same manner while the connection section 148 may be configured to diffuse light differently from the first and second section. In an alternative embodiment, each of the sections 144, 146 and 148 may be configured to diffuse light differently from each other. The sections may be configured to diffuse light differently by providing different pattern on the back surface, by providing different materials in each section, and/or by including different light shaping diffusers.

FIG. 2 illustrates a display system 200 according to another example embodiment of the present disclosure. The display system 200 may include backlight 220, a single display screen/panel 230 such as an LCD or OLED panel, and a projection screen 240. The display screen/panel 230 and backlight 220 are the same as those elements described above in connection with FIG. 1. In FIG. 2, the projection screen 240 may have a curved surface 242 to mimic realistic depth cues of elements of an instrument panel. Optionally, the projection screen may be made up with a curved portion 240, 244 as shown in FIG. 2 and a corrugated portion 140, 144, 146, 148 as shown in FIG. 1. For example, referring to FIG. 2, elements in the image to appear closer to the viewer may be displayed via the portion of surface 242 closest to the viewer 210, whereas element in the image to appear further from the viewer may be display via the portion of the surface farther from the viewer 210. For example, still referring to FIG. 2, a contoured rim surrounding a speedometer needle may be displayed to a viewer in a three dimensional manner so that portions of the rim to appear closer to the viewer may be displayed via the portion of curved surface 242 closest to the viewer 210, whereas portions of the rim to appear further from the viewer may be display via the portion of the surface farther from the viewer 210. As illustrated in FIG. 2, the projection screen 240 may also have a flat surface 244 and a dividing surface 246 that projects from the surface of the projection screen 240. The dividing surface may mimic a divide that separates information viewed via the flat surface 244 and the curved surface 242.

It is noted that the processing system controlling the display of the display screen 230 may be configured to adjust the displayed image to compensate for the geometric distortion caused to the image by the curved sections of the projection screen 240.

The embodiments illustrated in FIGS. 1 and 2 are shown with both the front and rear surfaces of the projection screen having a similar shape, but are not so limited. For example, in one embodiment, an entire rear surface of the projection screen may be parallel to the display screen while the front surface may have a specific shape to provide the realistic depth cues.

Although FIGS. 1 and 2 illustrate a single display screen 130, 230, it should be appreciated that the display system may include multiple display screens in other embodiments. The additional display screens may be positioned behind, next to or in front of the illustrated display screen. Further, it should be appreciated that the elements illustrated in FIGS. 1 and 2 are not drawn to scale, and thus, may comprise different shapes, sizes, etc. in other embodiments.

Figure 3:
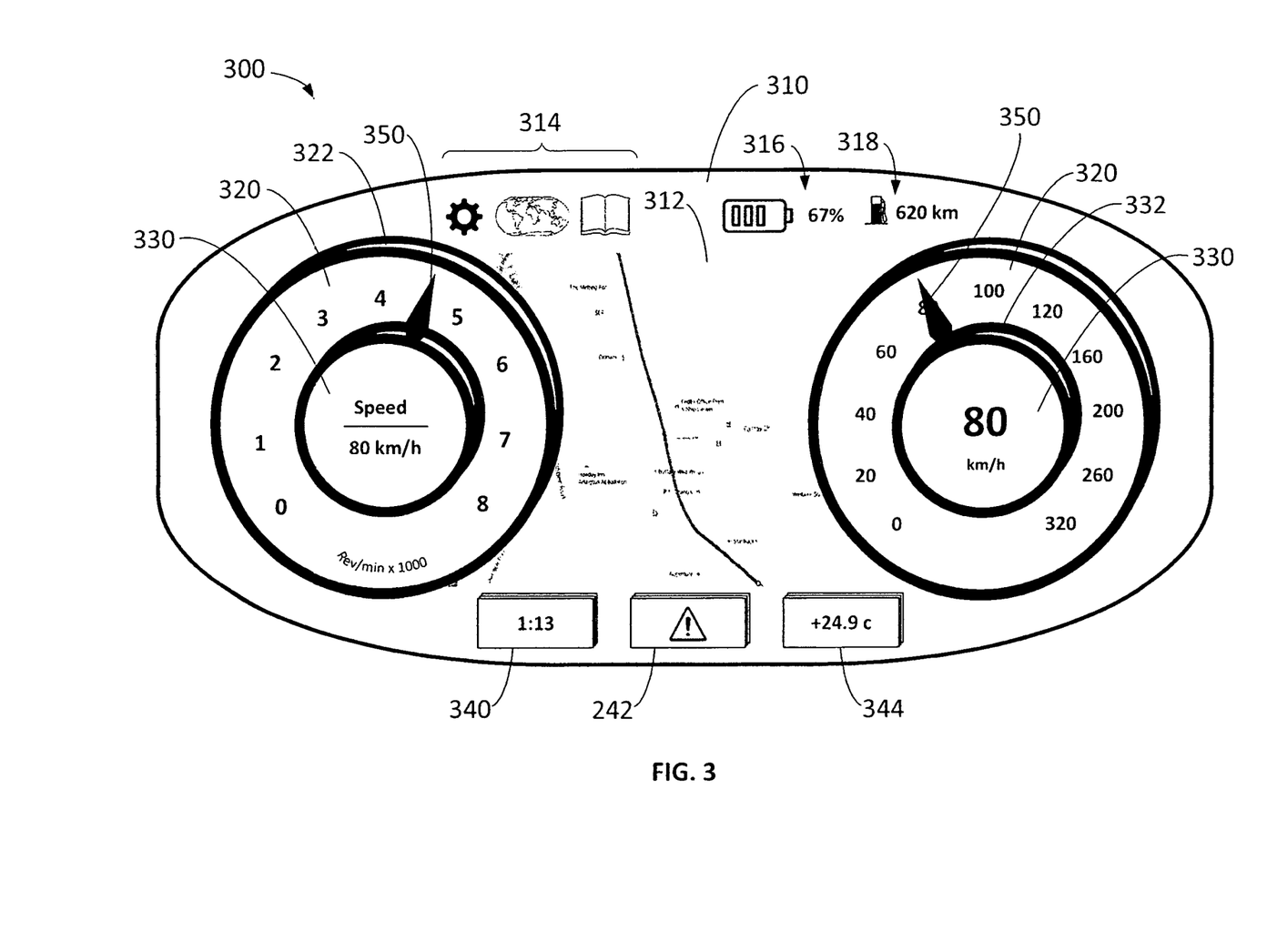
FIG. 3 illustrates a display of an instrument panel according to an embodiment of the present disclosure that may be portrayed to a viewer via any of the FIG. 1-2 or 4-5 embodiments.

FIG. 3 illustrates a display of an example instrument panel 300 according to an embodiment of the present disclosure. The instrument panel 300 display information in accordance with one or more of the embodiments disclosed in this application. The instrument panel 300 may display information on a display screen that is viewed via a shaped projection screen to provide realistic depth cues.

The shaped projection screen (e.g., 140) may include, at respective different elevations, a first section 310, a second section 320, a third section 330, fourth sections 340, 342, 344, and fifth sections 350. Each of these sections may be at a different elevation relative to the viewer and/or display panel, and may be connected to each other via connecting portions 148 such as in FIG. 1. The first section 310 may be coupled to the second section 320 by one or more connecting sections 322 (148). The second section 320 may be coupled to the third section 330 by one or more connection section 332 (148). Each of the sections 310, 320, 220, 340, 342, 344, and 350 may be parallel to the display screen and/or be provided at a different distance from the display screen, but is not so limited. In one embodiment, one or more of the sections 310-350 may be provided on a same plane. In one embodiment, one or more sections may have a slanted surface relative to the display screen and/or have a curved surface.

The first section 310 (e.g., see 144 in FIG. 1) may correspond to portions of the display screen that display, for example, navigation information 312, user controls 314, charge of vehicle 316, and/or predicated travel distance 318. The second section 320 may correspond to portions of the display screen that display, for example, gauges of a tachometer and/or speedometer. The third section 330 (e.g., see also 144 in FIG. 1) may correspond to portions of the display screen that display, for example, textual information of the speed of the vehicle. The fourth sections 340-344 (e.g., see 146 in FIG. 1) may correspond to portions of the display screen that display additional information, such as operating condition and/or warnings with text and/or graphics. And the fifth sections 350 (e.g., see 146 in FIG. 1) may be used to display needles for engine speed and/or RPMs, or optionally time of a clock. A user control may be provided to control the information and how the information is displayed in each of the sections (e.g., brightness, color, language, etc.).

When the second section 320 is displaced from the first section 310 in the direction of the observer, the tachometer and/or speedometer displayed in portions of the display screen corresponding to the second section 320 may mimic depth of traditional mechanical gauges. Connecting section 322 of the projection screen may connect the first section 310 and the second section 320 and may be slanted and/or curved relative to the other sections. The display screen may be configured to display a graphic in portion of the display screen corresponding to the connecting section 322 to help visualize the depth of the gauges.

When the third section 330 is displaced from the second section 320 in the direction of the observer, the center of tachometer and/or speedometer displayed in portions of the display screen corresponding to the third section 320 may mimic a surface with a depth that is displaced from the surface of the tachometer and/or speedometer. Connecting section 332 of the projection screen may connect the second section 320 and the third section 330 and may be slanted and/or curved relative to the other sections. The display screen may be configured to display a graphic in portion of the display screen corresponding to the connecting section 332 to help visualize displacement of the third section 330 from the second section 320.

According to one embodiment, each of the sections 310-350 of the projection screen may be displaced from one of the other sections a same distance. For example, the second section 320 may be displaced from the first section 310 the same distance as the third section 330 is displaced from the second section 320.

In another embodiment, the sections 310-350 of the projection screen may be displaced from each other at different distances. For example, the second section 320 may be displaced from the first section 310 a first distance, and the third section 330 may be displaced from the second section 320 a second distance that is smaller than the first distance. The fourth sections 340-350 may be displaced from the first section 310 a third distance that is different from the first distance and/or the second distance.

Figure 4:
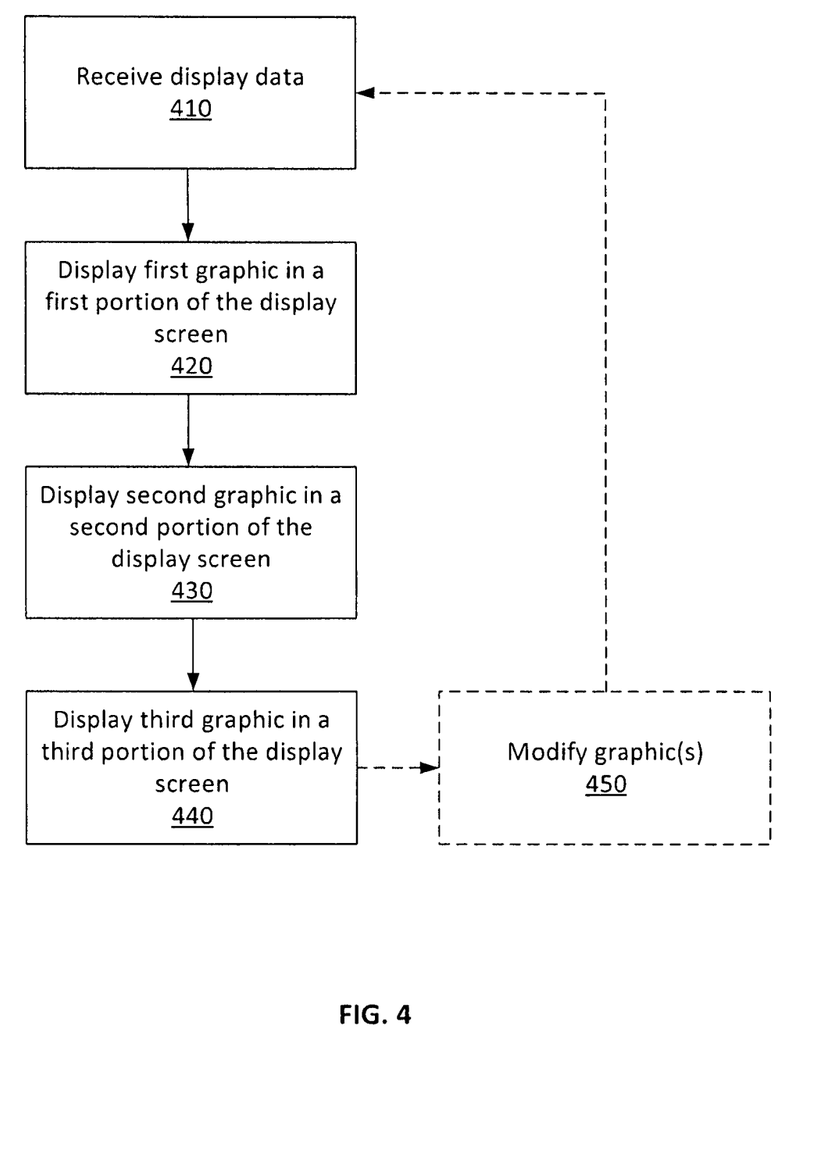
FIG. 4 illustrates a method for displaying information on a display according to any of FIGS. 1-3.

FIG. 4 illustrates a method 400 for displaying information on a display according to an embodiment of the present disclosure. The method 400 may include receiving display data 410, displaying a first graphic in a first portion of the display screen 420 (130 and/or 230), displaying a second graphic in a second portion of the display screen 430 (130 and/or 230), and displaying a third graphic in a third portion of the display screen 440 (130 and/or 230). The method may further include modifying one or more of the received graphics 450.

The received display data may be retrieved from memory coupled to a processing system and/or from another device. The display data may be received over a network which may be wireless. The received display data may include a plurality of graphics for display on a display including a shaped projection screen. Each of the plurality of graphics may be a separate image, sequence of images (e.g., video) and/or text. Each of the graphics may include one or more of images, objects, text, and/or animations. In one embodiment, the display data may comprise an image that includes a plurality of different graphics in different locations of the image. The display data may be periodically or continuously received with updated information for display.

The method 400 may include displaying, using the received display data, a first graphic of the plurality of graphics in a first portion of display screen. The first portion of the display screen may correspond to a first planar section of a rear projection screen disposed in front of the display screen. The first planar section may have a surface that is parallel to a surface of the display screen.

The method 400 may include displaying, using the received data, a second graphic of the plurality of graphics, in a second portion of display screen that is different from the first portion of the display screen. The second portion of the display screen may correspond to a second planar section of the rear projection screen disposed in front of the display screen. The second planar section may have a surface that is parallel to a surface of the display screen. The second planar section may be displaced from the first planar section in a direction away from the surface of the display screen or in a direction towards the surface of the display screen.

The method 400 may include displaying, a third graphic in a third portion of display screen that is different from the first and second portions of the display screen. The third portion of the display screen may correspond to a connecting section of the rear projection screen connecting the first section and the second section of the rear projection screen. A surface of the connecting section may be provided at an angle to a surface of the display screen. The connecting section may have a curved surface. The displayed third graphic may assist in visualizing the depth of the displayed graphics due to the shaped of the projection screen.

The modification of the one or more of the received graphics may be made to help visualize the displayed information. The modification of the graphic(s) may include modifying the third graphic displayed in the third portion of display screen. The modification may help to visualize the displayed graphic because the connecting section of the rear projection screen may not be parallel to the surface of the display screen. The modification may be made based on a dimensions of the third section and/or shape of the third section. The modification may be made after the display data is received by the processing system controlling the display. In one embodiment, the modification of the graphic(s) may be made before the data is received by the processing system controlling the display and/or by a processing system that is different from the processing system controlling the display.

Figure 5:
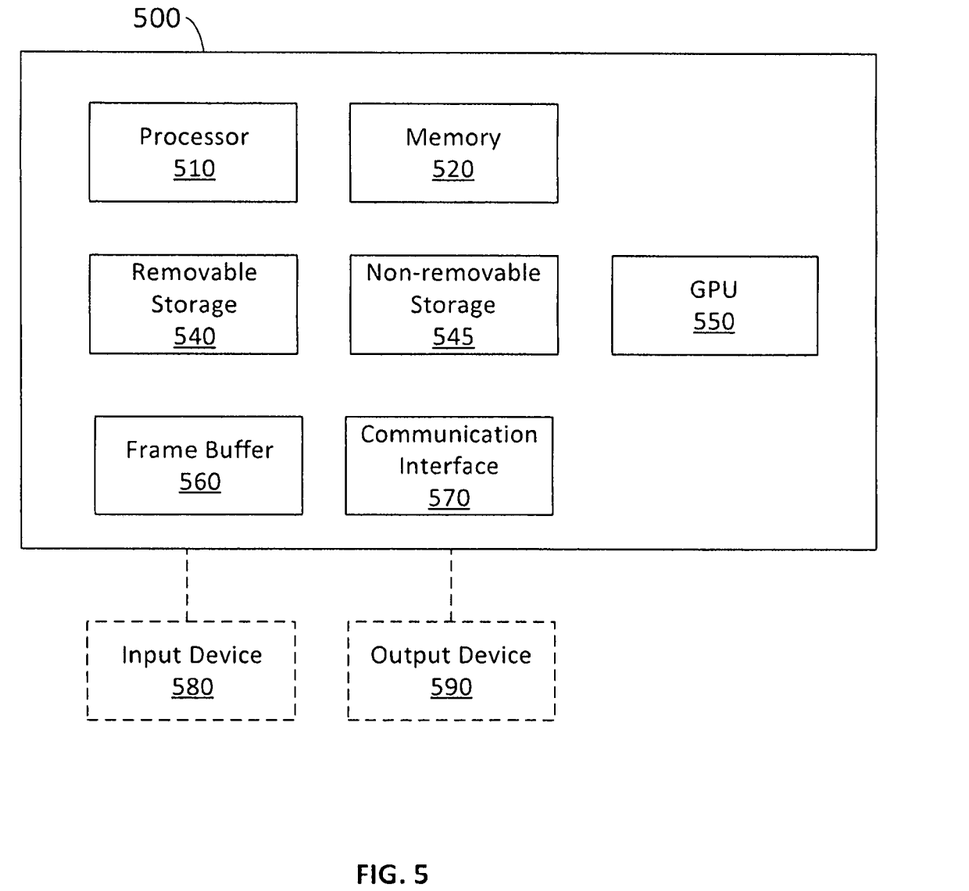
FIG. 5 illustrates an exemplary processing system upon which any of FIGS. 1-4 may be implemented.

FIG. 5 illustrates an exemplary processing system 500 upon which embodiments of the present invention(s) may be implemented. The processing system 500 may include one or more processors 510 and memory 520. The processor 510 may comprise a central processing unit (CPU) or other type of processor. Depending on the configuration and/or type of computer system environment, the memory 520 may comprise volatile memory (e.g., RAM), non-volatile memory (e.g., ROM, flash memory, etc.), or some combination of the two. Additionally, memory 520 may be removable, non-removable, etc.

In other embodiments, the processing system may comprise additional storage (e.g., removable storage 540, non-removable storage 545, etc.). Removable storage 540 and/or non-removable storage 545 may comprise volatile memory, non-volatile memory, or any combination thereof. Additionally, removable storage 540 and/or non-removable storage 545 may comprise CD-ROM, digital versatile disks (DVD) or other optical storage, magnetic cassettes, magnetic tape, magnetic disk storage or other magnetic storage devices, or any other medium which can be used to store information for access by processing system 500.

As shown in FIG. 5, the processing system 500 may communicate with other systems, components, or devices via communication interface 570. Communication interface 570 may embody computer readable instructions, data structures, program modules or other data in a modulated data signal (e.g., a carrier wave) or other transport mechanism. By way of example, communication interface 570 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 570 may also couple the processing system 500 to one or more input devices 580 (e.g., a keyboard, mouse, pen, voice input device, touch input device, etc.) and/or output devices 590 (e.g., a display, speaker, printer, etc.). The input devices 590 may be used by an observer to manipulate the way information is displayed on an output device 590 and/or what information and/or graphics are displayed in different portion of the output device 590. In one embodiment, communication interface 570 may couple the processing system 500 to a display including a display screen and a shaped projection screen disclosed in this application.

As shown in FIG. 5, a graphics processor 550 may perform graphics processing operations on graphical data stored in a frame buffer 560 or another memory of the processing system. Graphical data stored in frame buffer 560 may be accessed, processed, and/or modified by components (e.g., graphics processor 550, processor 510, etc.) of the processing system 500 and/or components of other systems/devices. Additionally, the graphical data may be accessed (e.g., by graphics processor 550) and displayed on an output device coupled to the processing system 500. Accordingly, memory 520, removable storage 540, non-removable storage 545, frame buffer 560, or a combination thereof, may comprise instructions that when executed on a processor (e.g., 510, 550, etc.) implement a method of processing graphical data (e.g., stored in frame buffer 560) for improved display quality on a display.

As shown in FIG. 5, portions of the present invention are comprised of computer-readable and computer-executable instructions that reside, for example, in a processing system 500 and which may be used as a part of a general purpose computer network (not shown). It is appreciated that processing system 500 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

In an example embodiment of this invention, there is provided a display system for displaying an image to a viewer in a three dimensional manner, the display system comprising: a display panel; a backlight configured to provide light to the display panel; a transparent projection screen on a front side of the display panel, so as to be located between the display panel and the viewer; and wherein the projection screen comprises a high elevation portion and a low elevation portion at first and second different respective elevations relative to the display panel, so that the projection screen is configured to display to the viewer a first element of the image via the high elevation portion and a second distinct element of the image via the low elevation portion, so that a difference in elevation between the high and low elevation portions causes the image to appear three dimensional to the viewer.

In the display system of the immediately preceding paragraph, the transparent projection screen may further include an angled connecting portion provided between and connecting the high and low elevation portions. The connecting portion may be angled from about 30-70 degrees relative to the high elevation portion.

In the display system of any of the preceding two paragraphs, the projection screen may comprise a random shaped pattern on a rear surface thereof facing the display panel.

In the display system of any of the preceding three paragraphs, the high and/or low elevation portion(s) may be substantially planar and/or may be substantially parallel to the display panel.

In the display system of any of the preceding four paragraphs, the high elevation portion may be configured to be closer to the viewer than is the low elevation portion.

In the display system of any of the preceding five paragraphs, the image may make up at least part of a vehicle instrument panel.

In the display system of any of the preceding six paragraphs, the first element may be a needle for indicating speed and/or RPMs of a vehicle, and the second element may comprise text and/or background behind the needle.

In the display system of any of the preceding seven paragraphs, the display panel may be a liquid crystal display panel or an OLED panel.

In the display system of any of the preceding eight paragraphs, the display system may have only one display panel.

In the display system of any of the preceding nine paragraphs, the height difference in elevation between the high elevation portion(s) and the low elevation portion(s) is on the order of millimeters (mm) and may be from about 4 mm to 20 mm, more preferably from about 6 mm to 16 mm, and sometimes from about 8-15 mm.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

We claim:

1. A display system for displaying an image to a viewer in a three dimensional manner, the display system comprising:

a display panel;

a backlight configured to provide light to the display panel;

a transparent plastic projection screen on a front side of the display panel, so as to be located between the display panel and the viewer; and wherein the transparent plastic projection screen comprises a high elevation portion and a low elevation portion at first and second different respective elevations relative to the display panel, wherein the high elevation portion is at a higher elevation than is the low elevation portion relative to the display panel, so that the transparent plastic projection screen is configured to display to the viewer a first element of the image via the high elevation portion and a second distinct element of the image via the low elevation portion, so that a difference in elevation between the high elevation portion and the low elevation portion causes the image to be displayed in a three dimensional manner to the viewer.

2. The display system of claim 1, wherein the transparent projection screen further includes an angled connecting portion provided between and connecting the high elevation portion and the low elevation portion.

3. The display system of claim 2, wherein the connecting portion is angled from 30-70 degrees relative to the high elevation portion.

4. The display system of claim 1, wherein the projection screen comprises a pattern on a rear surface thereof facing the display panel.

5. The display system of claim 1, wherein the high elevation portion and/or the low elevation portion are planar and are parallel to the display panel.

6. The display system of claim 1, wherein the high elevation portion is configured to be closer to the viewer than is the low elevation portion.

7. The display system of claim 1, wherein the image is an image making up at least part of a vehicle instrument panel.

8. The display system of claim 1, wherein the first element is a needle for indicating speed and/or RPMs of a vehicle, and wherein the second element comprises text and/or background behind the needle.

9. The display system of claim 1, wherein the display panel is a liquid crystal display panel.

10. The display system of claim 1, wherein the display system contains no display panel other than said display panel.

11. The display system of claim 1, wherein the difference in elevation between the high elevation portion and the low elevation portion, relative to the display panel, is from 4 mm to 20 mm.

12. The display system of claim 1, wherein the difference in elevation between the high elevation portion and the low elevation portion, relative to the display panel, is from 6 mm to 16 mm.

13. The display system of claim 1, wherein the high elevation portion and the low elevation portion are each planar and are each parallel to the display panel.

* * * * *